United States Patent Office 3,455,662
Patented July 15, 1969

3,455,662
HIGH-STRENGTH, WHISKER-REINFORCED
METALLIC MONOFILAMENT
John Audley Alexander, 3929 L'Enfant Drive, Fort
Washington, Md., and Robert G. Shaver, 9343
Athens Road, Burke, Va. 22015
No Drawing. Filed Dec. 6, 1966, Ser. No. 599,361
Int. Cl. B23p *17/00;* B22f *7/04*
U.S. Cl. 29—191.4                                              4 Claims This invention relates to high-strength monofilaments, and more particularly, to a high-strength, whisker reinforced metallic monofilaments, and to a method of making such monofilaments.

Reinforcement of materials with high-strength fibers has been used extensively for greatly improving their strength-to-density ratio. Such reinforced bodies are referred to in the art as fiber-reinforced composites. A typical composite comprises a matrix material in which is incorporated a plurality of reinforcement fibers which impart the desired high strength to the resultant composite. The fibers may be metallic, ceramic or refractory materials, with an amorphous, polycrystalline or single crystal structure. Three recent review articles give excellent and extensive summaries of the theory and experimental aspects of fiber-reinforced composites. These are:

(1) A. Kelly and G. J. Davies: Metallurgical Reviews, 10, 1–77 (1965);

(2) D. Cratchley; Metallurgical Reviews, 10, 79–144 (1965); and (3) T. Vasilos and E. G. Wolff; Journal of Metals, 18, 583–592 (1966).

The strength of fiber-reinforced composites appears to be dependent upon a number of factors, one of which is the degree of alignment of the fibers in the direction where the high strength property is desired. Continuous fibers have been aligned by winding the fibers on a preformed mandrel in the shape of the article, and then applying a matrix material directly over the wound fibers to form the composite.

For discontinuous fibers, particularly single crystal fibers, i.e. whiskers, the problem of fiber alignment has been more difficult. However, because of their high strength properties, whiskers are considered a material of choice for fiber-reinforced composites. Whiskers are extremely small in size, which presents an exceedingly difficult problem in handling and orientation. For example, often whiskers become bent and damaged during incorporation into the matrix.

Prior art techniques have attempted to align the whiskers in a matrix while forming the desired composite. These techniques generally proceed from a whisker slurry, which necessitates relative motion between the constituents. The need for a slurry having optimum flow or shear characteristics for the incorporation step is greatly complicated by the need for a high volume percent of whiskers in the matrix. Conventional whisker composite fabrication techniques, including casting, extrusion, or drawing of a whisker slurry all require fluid flow of the composite mixture. Fluid flow of very concentrated whisker slurries is difficult due to the jamming of particles during flow. Accordingly, these techniques have not been very successful in the past, particularly where a high concentration of whiskers is desired.

An approach to the manufacture of whisker-reinforced metallic composites using discontinuous whiskers has been to start with a wool form of the whiskers and blend the wool with a metal alloy matrix material in powder form with a binder and water. The mixture then is extruded and the resultant composite is dried to remove water. The dry mixture is then hot-pressed to consolidate the matrix metal. Such a composite, however, shows a notable lack of reproducibility of tensile strength and whisker alignment.

In view of the prior art inadequacies in making whisker composites having desirable properties, and particularly those having a metallic matrix, it would be extremely advantageous to develop a monofilament form of elongated whisker fibers in a metallic matrix. Such a whisker monofilament should have a high degree of whisker alignment, and should be compact and flexible so that it can be handled readily in making composite articles of high strength.

Accordingly, it is an object of the present invention to provide a high-strength, whisker-reinforced metallic monofilament.

Another object is to provide such a monofilament in which the whiskers are substantially aligned in the elongate direction of the monofilament.

A further feature of the invention is the use of a substrate around which a whisker roving is aligned in the elongate direction of the wire as the medium for electroplating the metallic matrix outward from the substrate through the whiskers to form the monofilament.

Among the other features herein is the provision of a high-strength composite which includes a plurality of the whisker monofilaments of the invention bonded together to form a shaped article of manufacture.

These and other objects and features of the invention will be made apparent from the following more particular description of the invention.

In accordance with the present invention, there is provided a high-strength, whisker-reinforced metallic monofilament which is capable of being handled readily for making composite articles of manufacture. The monofilament includes a plurality of high-strength whiskers which are substantially aligned in the elongate direction of the monofilament. The whiskers are present in the monofilament in the form of a roving around a substrate. The assembly of the whisker roving and the substrate is enclosed by a metallic matrix which extends outward from the wire through the whiskers. The entire article is shaped in the form of a monofilament having a small diameter.

In general, the whisker monofilament of the present invention is fabricated by selecting elongated whiskers which possess inter-whisker force couples which will produce internal bending sufficient to enable whisker alignment along a predetermined axis of predominate forces. A plurality of such whiskers then are subjected to dry-spinning on a substrate to produce a porous intertwined whisker roving element. The whisker roving element then is provided with a metallic matrix preferably by electroplating, although vapor deposition may be used as well. Upon electroplating the metallic material fills the voids and interstices of the roving to form the outer surfaces of the monofilament.

The whisker materials usually are selected from among metallic and non-metallic oxides, carbides, nitrides, silicides and borides. Typical whisker compounds for use herein are aluminum oxide, silicon carbide, aluminum nitride, aluminum diboride, silicon nitride, boron carbide, boron nitride, boron silicide, tungsten carbide, titanium diboride, titanium nitride, beryllium oxide, and beryllium boride. Those whiskers having most desirable properties necessary ofr making high-strength, compact, flexible, elongated whisker monofilaments according to the present invention have a length-to-diameter ratio of at least 250, and suitably in the range of about 250–10,000, or higher.

A typical whisker material for use herein is silicon carbide having a length-to-diameter ratio of about 250–10,000. Such whiskers generally have lengths of about 1,000–10,000 microns and a diameter of about 1–4 microns. Preferably the whiskers are the beta-modification of silicon carbide having a triangular cross-section and a (111) crystal face exposed along the length thereof. Such whiskers possess tensile strengths in the order of 1 million p.s.i., and an elastic modulus of about 100 million.

The substrate material in the monofilament of the invention provides a support for the whisker roving. When electroplating is employed for deposition of the metallic matrix, it provides a conductive path for electroplating of the metallic matrix around the whisker roving. Typical substrate materials for use herein include tungsten, molybdenum, nickel, and the like, preferably in the form of a fine wire. A whisker material or the roving itself, also may function as the substrate, particularly when it is conductive itself.

The electrodeposition of the metallic matrix material takes place outwardly from the substrate and around the whisker roving. In this electrodeposition process it is preferable that the whiskers themselves possess some degree of conductivity. Thereby deposition can occur on the whiskers simultaneously with deposition on the substrate, thus facilitating the formation of a uniform filament in which the metallic matrix constitutes substantially the entire outer surfaces of the filament. For those whisker materials which do not possess some conductivity it is desirable to provide them with a thin metallic conductive coating, as for example, by vapor plating or other deposition technique.

The metallic matrix material may be selected from among such metals as nickel, aluminum, copper, cobalt, chromium, tin and the like, although these metals are to be considered only as representative of the large number of different metallic materials which may be employed for this purpose.

The monofilament of the invention is prepared typically in the following manner. A ½ mil diameter nickel wire is provided in a length of about 5 inches. A plurality of silicon carbide whiskers then are dry-spun around the nickel wire so that they are aligned in the longitudinal direction of the wire in the form of a whisker roving. The nickel wire having the whisker roving thereon then is mounted in a nickel electroplating bath, and a nickel overlayer is electrodeposited outward from the nickel wire through the whisker roving until it forms the outer surfaces of the monofilament. The resulting monofilament exhibits a uniform surface and a generally uniform whisker concentration throughout the monofilament.

The whisker concentration in the monofilament can be adjusted by the density of the whisker roving and the thickness of the metal overlayer. A typical monofilament has a volume percent of whisker material of about 0.1 to 70 percent. A silicon carbide-nickel monofilament having a whisker concentration between 8–10 volume percent, for example, exhibits very desirable high-strength properties. The tensile strength of the whiskers in such a monofilament is about 83,000 to 126,000 p.s.i. The modulus of the monofilament is about 30 and $44 \times 10^6$ p.s.i.

What has been described herein is a novel high-strength whisker-reinforced metallic filament and a preferred electrodeposition technique for making such a filament. Once such filaments are made available as described herein, composite articles of manufacture may be prepared by hot pressure bonding a plurailty of the monofilaments into a shaped structure.

Although the invention has been described with particular reference to certain embodiments thereof, it will be understood that changes and modifications may be made which are within the skill of the art. It is intended to be limited only by the appended claims, in which what is claimed is:

1. A high-strength, whisker-reinforced metallic filament comprising:
   (a) a metallic substrate,
   (b) a plurality of high-strength whiskers selected from among metallic and non-metallic oxides, carbides, nitrides, silicides and borides surrounding said substrate, and
   (c) a metallic matrix extending outwardly from said substrate and covering said whiskers to form the outer surfaces of said filament.

2. A high-strength whisker-reinforced metallic filament according to claim 1 wherein said whiskers are present in the form of a roving which is aligned substantially longitudinally of said substrate.

3. A high-strength, whisker-reinforced metallic filament according to claim 1 wherein said substrate is in the form of a wire.

4. A high-strength, whisker-reinforced metallic filament according to claim 1 wherein the concentration of said whiskers is about 0.1 to 70 volume percent.

References Cited
UNITED STATES PATENTS

| | | | |
|---|---|---|---|
| 3,084,421 | 4/1963 | McDanels et al. | 29—183.5 |
| 3,098,723 | 7/1963 | Micks | 29—183.5 |
| 3,282,658 | 11/1966 | Wainer | 29—183.5 |

L. DEWAYNE RUTLEDGE, Primary Examiner

E. L. WEISE, Assistant Examiner

U.S. Cl. X.R.

29—191.6